US009393983B2

(12) United States Patent
Bost

(10) Patent No.: US 9,393,983 B2
(45) Date of Patent: Jul. 19, 2016

(54) BUGGY

(71) Applicant: Greentom IP and Licensing BV, PB Maastricht (NL)

(72) Inventor: Bart Bost, PB Maastricht (NL)

(73) Assignee: Greentom IP and Licensing BV, Maastricht (NL)

( * ) Notice: Subject to any disclaimer, the term of this patent is extended or adjusted under 35 U.S.C. 154(b) by 0 days.

(21) Appl. No.: 14/631,878

(22) Filed: Feb. 26, 2015

(65) Prior Publication Data

US 2015/0166092 A1    Jun. 18, 2015

Related U.S. Application Data

(63) Continuation of application No. 13/822,333, filed as application No. PCT/EP2011/065638 on Sep. 9, 2011, now Pat. No. 8,998,243.

(30) Foreign Application Priority Data

Sep. 13, 2010    (DE) .......................... 10 2010 037 506

(51) Int. Cl.
  *B62B 7/10*    (2006.01)
  *B62B 7/00*    (2006.01)
  *B62B 7/06*    (2006.01)
  (Continued)

(52) U.S. Cl.
  CPC . *B62B 7/10* (2013.01); *B62B 7/004* (2013.01); *B62B 7/064* (2013.01); *B62B 7/08* (2013.01); *B62B 9/087* (2013.01); *B62B 2501/04* (2013.01); *B62B 2501/065* (2013.01)

(58) Field of Classification Search
  CPC .......... B62B 7/004; B62B 7/064; B62B 7/08; B62B 9/087
  See application file for complete search history.

(56) References Cited

U.S. PATENT DOCUMENTS 4,537,414 A  *  8/1985  Nusbaum ............. B60N 2/2839
                                              280/30
5,197,753 A  *  3/1993  Liu ........................... B62B 7/08
                                              280/642
(Continued)

FOREIGN PATENT DOCUMENTS

EP    1503095 A1    2/2005
EP    1538062 A1    6/2005
NL    WO 2005012738 A1 *  2/2005  .............. B62B 7/062

OTHER PUBLICATIONS

Office Action of Aug. 27, 2014, for parent U.S. Appl. No. 13/822,333 (attached).

*Primary Examiner* — Brodie Follman
*Assistant Examiner* — Brian Cassidy
(74) *Attorney, Agent, or Firm* — Michael Soderman

(57) ABSTRACT

The present invention relates to a buggy or collapsible perambulator. It is comprised of a sliding frame which, in the unfolded state, runs in an inclined plane and has a division, in the region of which joints are located, and therefore, upon collapsing, an upper portion of the sliding frame is pivotable in relation to a lower portion of the sliding frame about the approximately horizontal axis of said joints. It is further comprised of an underframe with wheels, wherein, in the collapsed state, the lower portion and upper portion of the sliding frame and at least parts of the underframe are virtually parallel or are at a flat angle to each other and the buggy assumes a flat, compact state. The two sliding-frame portions which are pivotable in relation to each other each have approximately the shape of a U bar.

9 Claims, 13 Drawing Sheets

(51) Int. Cl.
    *B62B 7/08*    (2006.01)
    *B62B 9/08*    (2006.01)

(56) References Cited

U.S. PATENT DOCUMENTS

| | | | | |
|---|---|---|---|---|
| 5,234,226 | A * | 8/1993 | Liu | B60B 33/0002 16/35 R |
| 5,421,603 | A * | 6/1995 | Wills | B62B 7/08 280/642 |
| 5,622,377 | A * | 4/1997 | Shamie | B62B 7/08 280/47.4 |
| 6,513,827 | B1 * | 2/2003 | Barenbrug | B62B 7/147 280/643 |
| 6,722,690 | B2 * | 4/2004 | Lan | B62B 7/08 280/47.38 |
| 6,736,415 | B1 * | 5/2004 | Lenihan | B25H 1/12 280/47.19 |
| 6,863,297 | B2 * | 3/2005 | Shapiro | B62B 1/206 280/642 |
| 6,991,248 | B2 * | 1/2006 | Valdez | B62B 7/08 280/642 |
| 7,185,909 | B2 * | 3/2007 | Espenshade | B62B 7/10 280/639 |
| 7,267,359 | B1 * | 9/2007 | Yang | B62B 7/08 280/47.34 |
| 7,401,803 | B1 * | 7/2008 | Lai | B62B 7/08 280/47.38 |
| 7,527,283 | B2 * | 5/2009 | Horacek | B62B 7/068 280/29 |
| 7,632,035 | B2 * | 12/2009 | Cheng | B62B 7/08 280/642 |
| 7,651,116 | B2 * | 1/2010 | Hou | B62B 7/08 280/642 |
| 7,694,996 | B2 * | 4/2010 | Saville | B62B 7/062 280/47.38 |
| 7,717,456 | B2 * | 5/2010 | Chen | B62B 7/083 280/642 |
| 7,766,366 | B2 * | 8/2010 | Li | B62B 7/08 280/642 |
| 7,770,905 | B2 * | 8/2010 | Dotsey | B60B 33/0002 16/18 R |
| 7,798,500 | B2 * | 9/2010 | Den Boer | B62B 7/062 280/47.34 |
| 7,900,952 | B2 * | 3/2011 | Cone, II | B62B 7/068 280/642 |
| 8,083,240 | B2 * | 12/2011 | Jacobs | B62B 9/18 280/47.38 |
| 8,087,689 | B2 * | 1/2012 | Fritz | B62B 7/062 280/647 |
| 8,128,119 | B2 | 3/2012 | Saville et al. | |
| 8,226,110 | B2 * | 7/2012 | Liao | B62B 7/062 280/47.38 |
| 8,276,935 | B2 * | 10/2012 | Minato | B62B 7/062 280/47.38 |
| 8,408,580 | B2 * | 4/2013 | Liao | B62B 7/086 280/642 |
| 8,474,854 | B2 * | 7/2013 | Dean | B62B 7/08 280/47.38 |
| 8,496,263 | B2 * | 7/2013 | Wu | B62B 7/068 280/47.38 |
| 8,534,698 | B2 * | 9/2013 | Dotsey | B62B 7/08 280/642 |
| 8,540,059 | B2 | 9/2013 | Li et al. | |
| 8,596,669 | B2 * | 12/2013 | Liao | B62B 7/08 280/47.38 |
| 8,602,442 | B2 * | 12/2013 | Li | B62B 7/062 280/642 |
| 8,696,015 | B2 * | 4/2014 | Karremans | B62B 7/062 280/642 |
| 8,696,016 | B2 * | 4/2014 | Homan | B62B 7/105 280/47.34 |
| 8,894,089 | B2 * | 11/2014 | Clifton | B62B 5/0023 280/642 |
| 8,899,613 | B2 * | 12/2014 | Cheng | B62B 7/008 280/47.38 |
| 8,950,761 | B2 * | 2/2015 | Chen | B62B 7/08 280/47.36 |
| 8,991,852 | B2 * | 3/2015 | Mitzman | B62B 5/067 280/642 |
| 8,998,243 | B2 * | 4/2015 | Bost | B62B 7/004 280/647 |
| 9,056,622 | B2 * | 6/2015 | Thomas | B62B 7/008 |
| 2007/0164538 | A1 * | 7/2007 | Yeh | B62B 7/062 280/642 |
| 2008/0088116 | A1 | 4/2008 | Den Boer | |
| 2008/0093824 | A1 | 4/2008 | Chen | |
| 2008/0179848 | A1 * | 7/2008 | Lake | B62B 7/123 280/47.41 |
| 2009/0160146 | A1 | 6/2009 | Berthiaume | |
| 2010/0109293 | A1 | 5/2010 | Friisdahl | |
| 2010/0127480 | A1 * | 5/2010 | Ahnert | B62B 7/08 280/647 |
| 2012/0292978 | A1 * | 11/2012 | Buschjohann | B60G 21/051 301/6.5 |
| 2012/0319382 | A1 * | 12/2012 | Lin | B62B 7/10 280/647 |

* cited by examiner

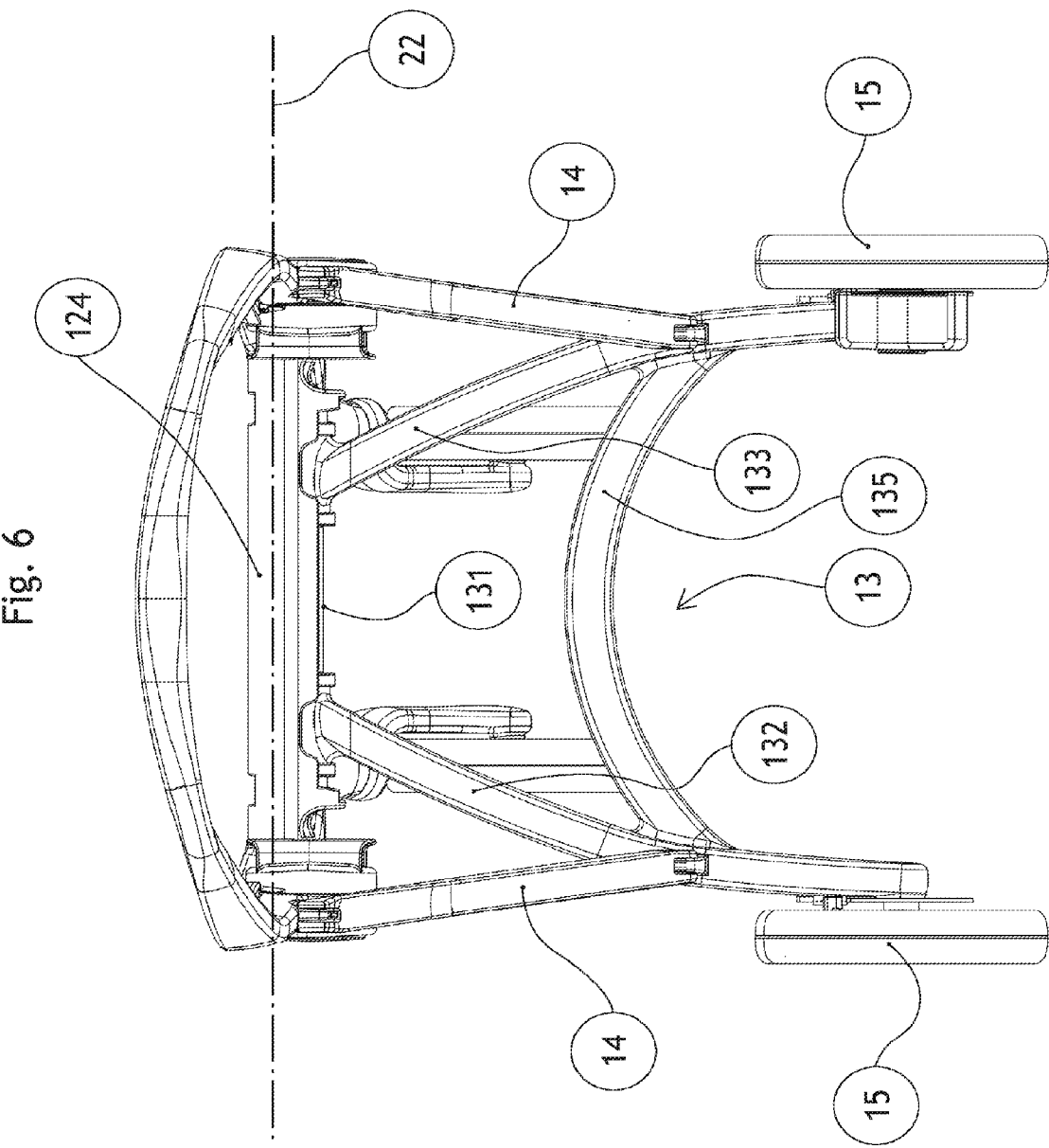

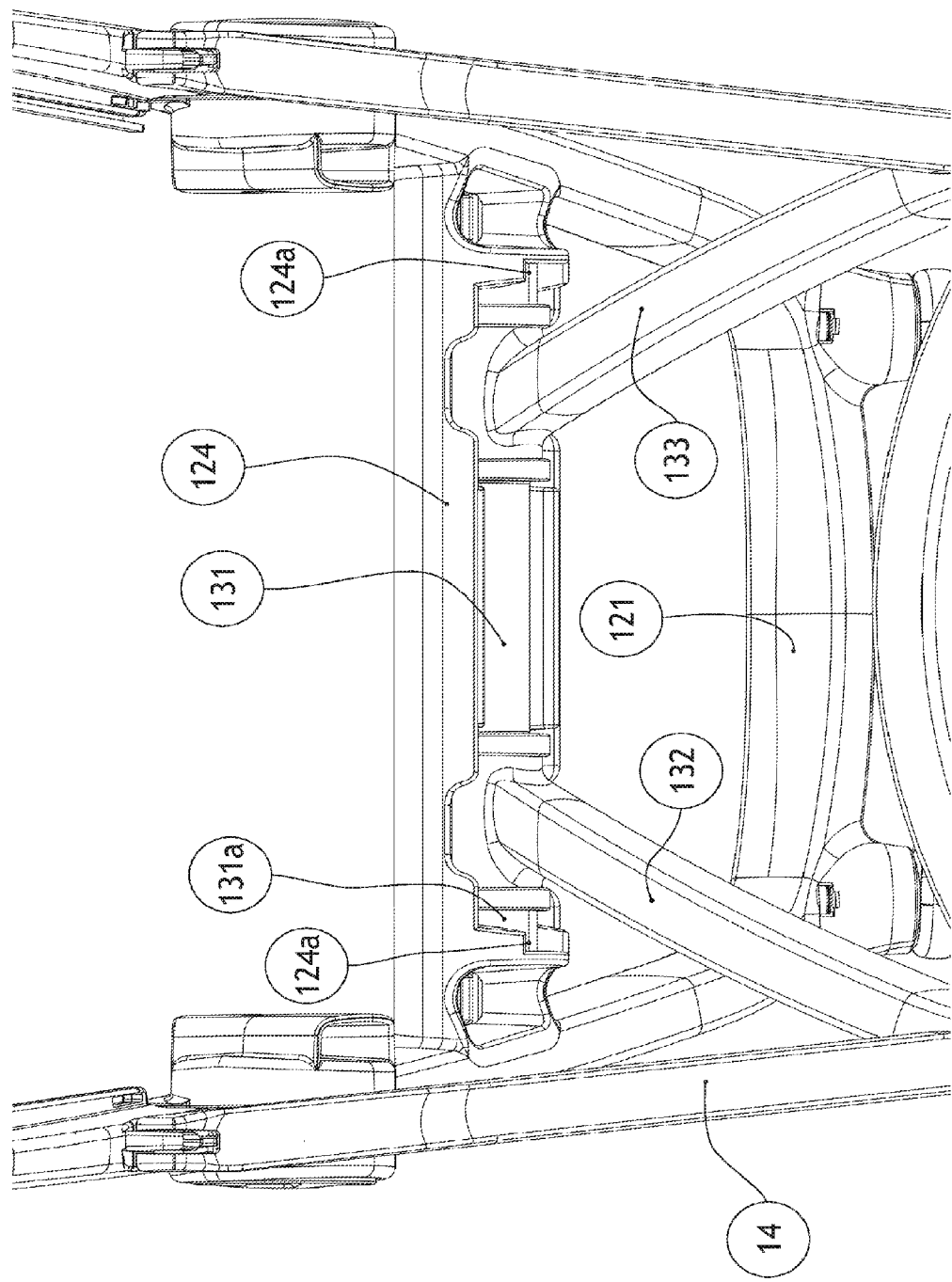

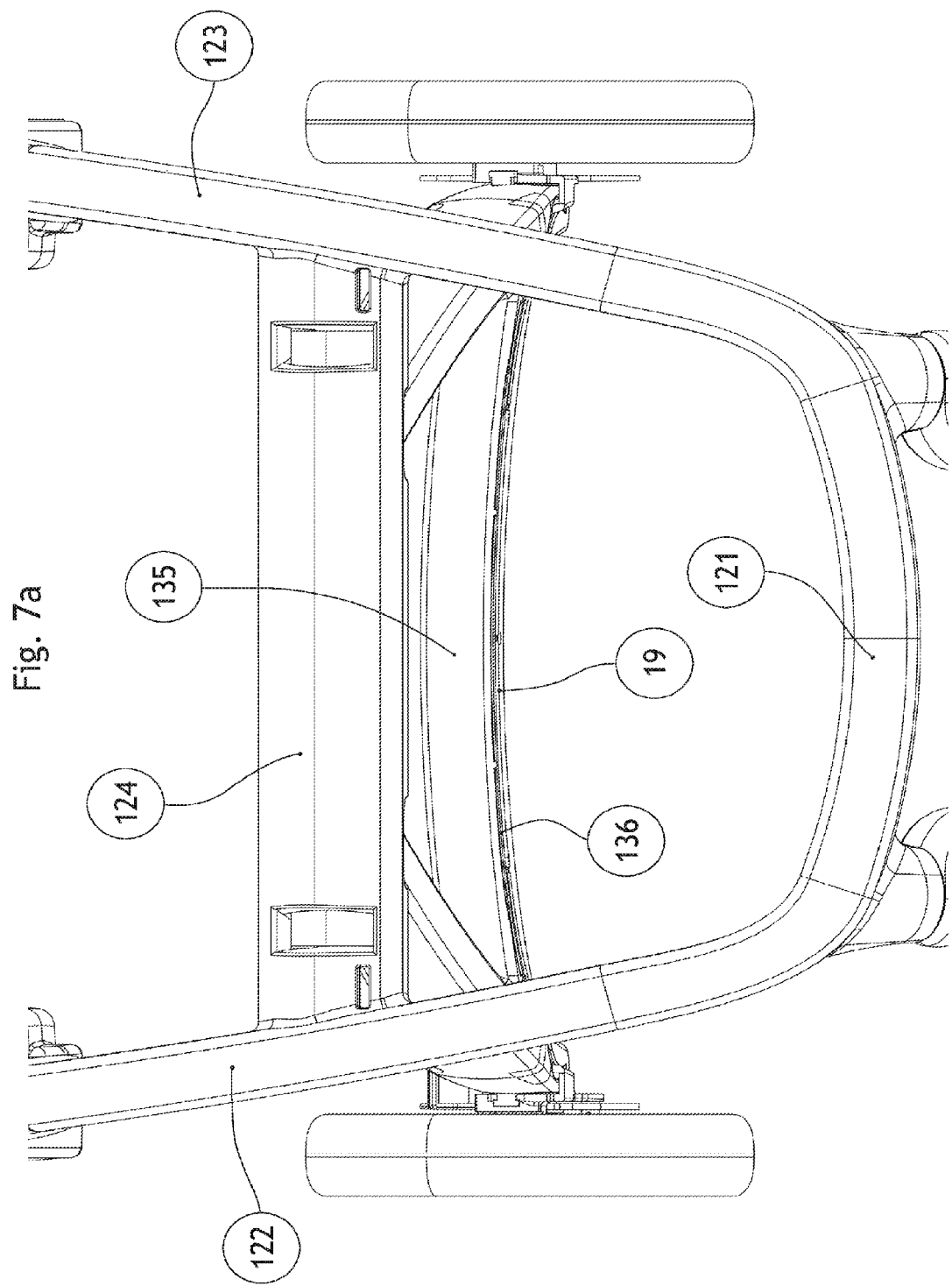

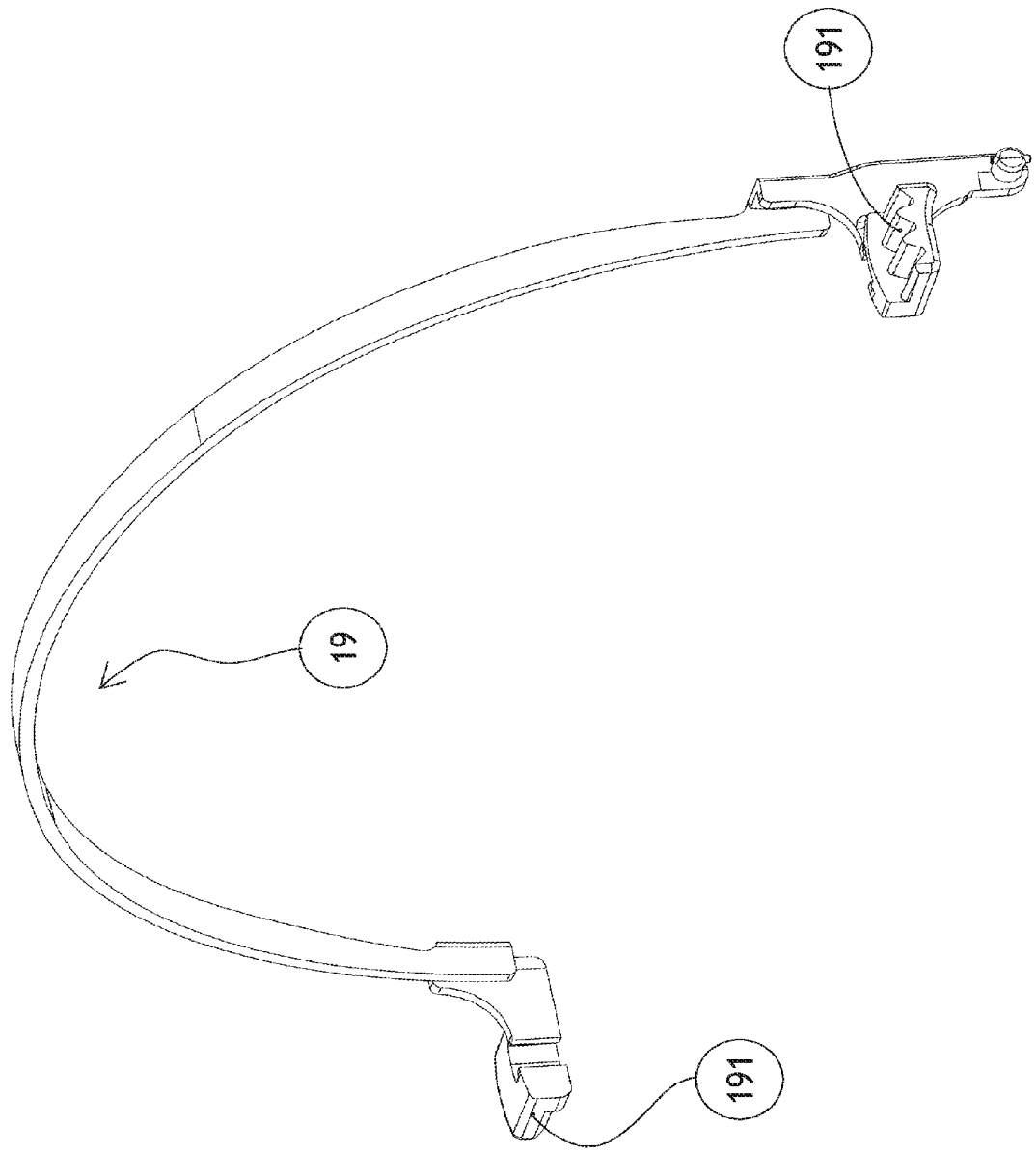

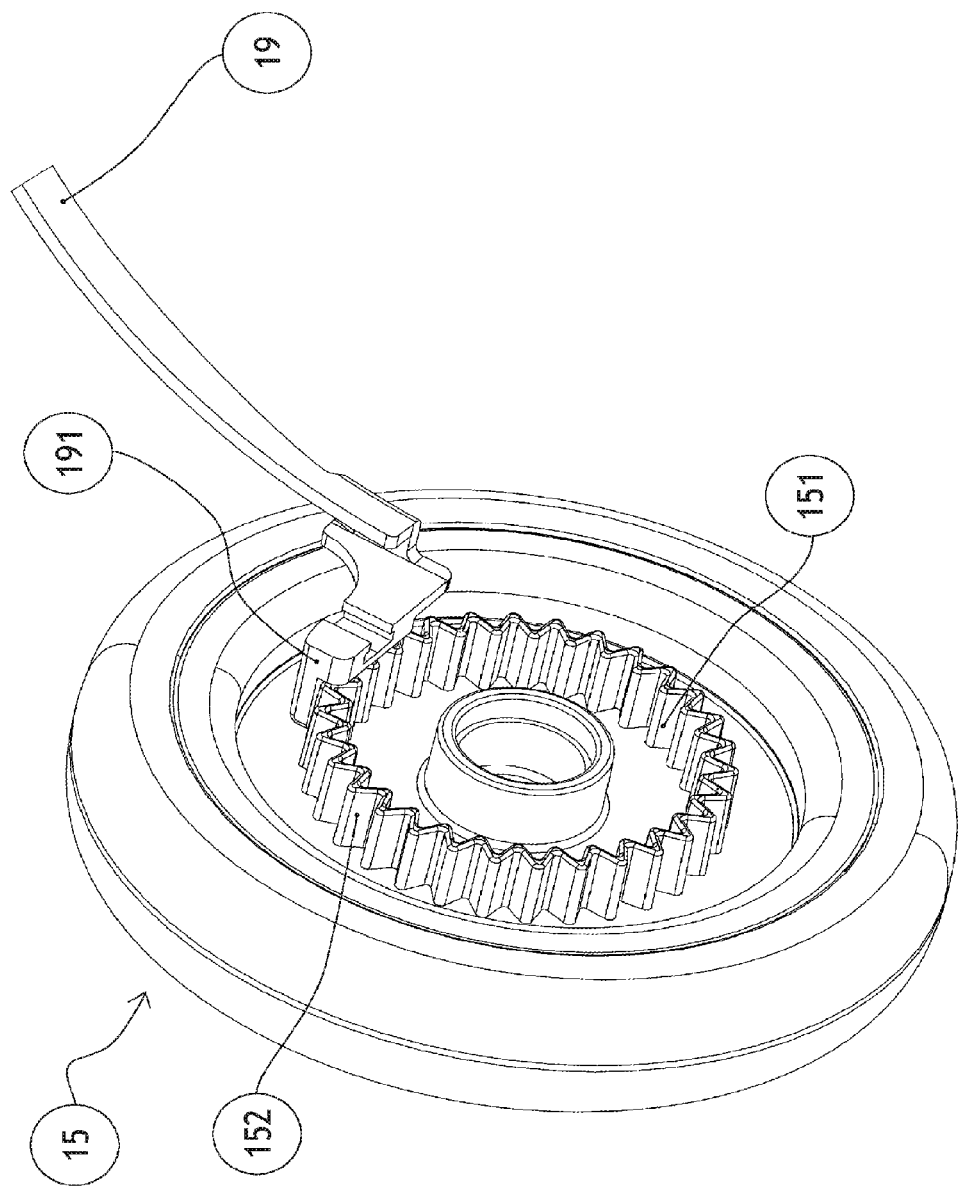

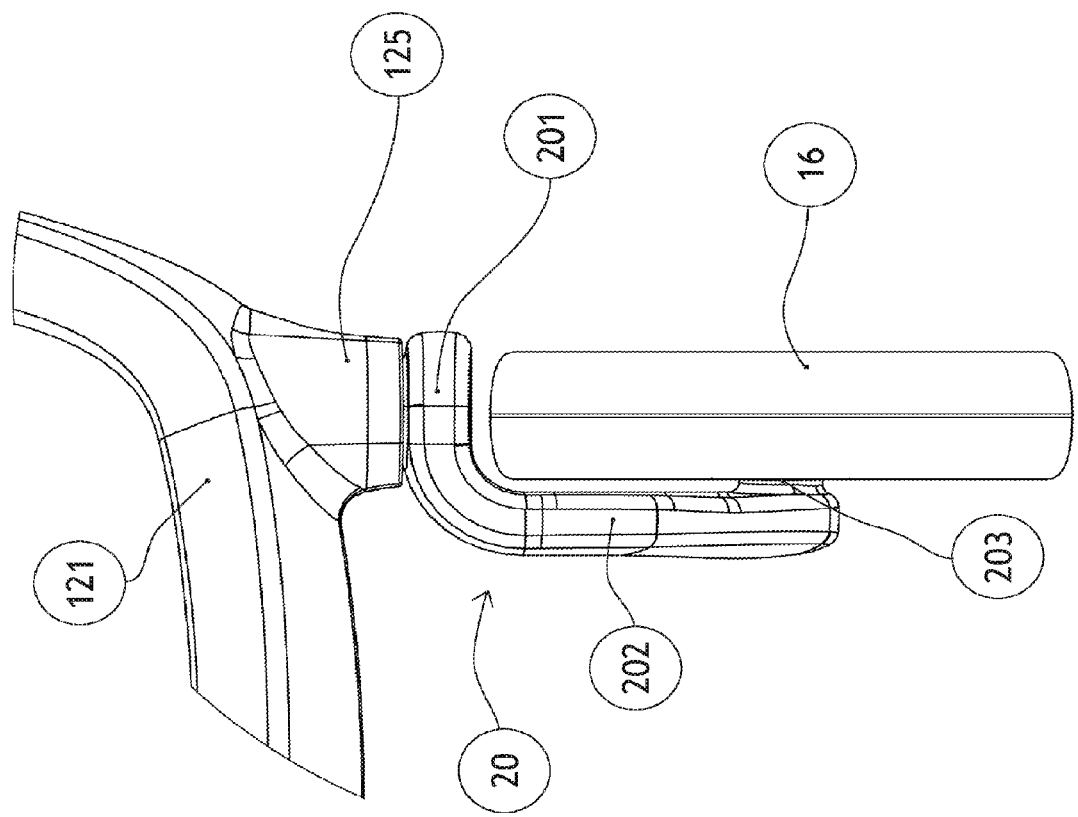

BUGGY

CROSS REFERENCE TO RELATED APPLICATIONS

This application is a continuation of U.S. Ser. No. 13/822,333, filed on Mar. 26, 2013, which is the U.S. national stage of International Application No. PCT/EP2011/065638, filed on Sep. 9, 2011, and claims the benefit thereof. The international application claims the benefits of German Application No. 102010037506.3 filed on Sep. 13, 2010; all applications are incorporated by reference herein in their entirety.

BACKGROUND

The instant invention relates to a buggy or collapsible perambulator, comprising a sliding frame which, in the unfolded state, runs in an inclined plane and has a division, in the region of which joints are located, and therefore, upon collapsing, an upper portion of the sliding frame is pivotable in relation to a lower portion of the sliding frame about the approximately horizontal axis of said joints, and furthermore comprising an underframe with wheels, wherein, in the collapsed state, the lower portion and upper portion of the sliding frame and at least parts of the underframe are virtually parallel or are at a flat angle to each other and the buggy assumes a flat, compact state, wherein the two portions of the sliding frame, which are pivotable in relation to each other, each have approximately the shape of a U bar, wherein the suspensions of the front wheels are located on the lower portion of the sliding frame, and the suspensions for the rear wheels are located on a rear frame of the underframe, said rear frame having a horizontal transverse strut.

In the instant invention, a buggy is understood to mean a push cart for infants, in which, in the unfolded state, the infant assumes a sitting position, in contrast to the classic perambulator, which accommodates babies or infants in a portable container, which can be detached for the most part, in a lying position.

A buggy or perambulator is known from DE 20 2008 017 305 U1, for example. As is the case with many standard types, a basic horizontal structure is present in the case of this buggy as underframe, on which the rear wheels are located and which extends between rear wheels and front wheels. The front wheels are attached to a strut, which runs in transverse direction. Support elements, the ends of which are in each case connected in an articulated manner to the sliding frame as well as to the underframe, run between the inclined sliding frame and the basic horizontal structure. As is known per se in the case of buggies, the seat unit is attached to the frame of the buggy so as to be capable of being detached. However, the pivoting about the joints takes place here in response to the collapsing such that the upper portion of the sliding frame is folded in the direction of the lower portion of the sliding frame. In the case of buggies, however, it is also possible to carry out this pivoting in reverse direction of rotation, so that the upper portion of the sliding frame is pivoted backwards in response to being collapsed. In the case of the known buggy, provision is made for releasing the locking of the joints for a downwards pushing movement of the upper portion of the sliding frame. Other mechanisms for releasing the joints, however, are also possible, for example at the joints themselves, which is not important in the context of the instant invention.

A further buggy is known from DE 10 2007 047 702 A1. In the case of this known buggy, the underframe consists of front pipes, which point approximately in the direction of the front wheels, and of rear pipes, which extend approximately in the direction of the rear wheels, wherein, in the unfolded state, viewed in the side view, rear pipes and front pipes form a virtually right-angled triangular formation having an apex, which is located on the top, and wherein the sliding frame is then approximately aligned with the front pipes. An arrangement of struts, which are connected to each other in an articulated manner, with said arrangement being pulled upwards and folding in the center in response to being collapsed, runs on the bottom between the front pipes and the rear pipes, approximately horizontally. In the compact, collapsed state, the rear wheels, which pivot inwards here about an inclined axis, are located between the front wheels. To shorten the frame lengthwise in response to collapsing it, provision is furthermore made here for the sliding frame to be pushed through a mount in the direction of the front wheels. Two motion sequences are thus necessary for the collapsing, namely a pivoting, for collapsing the underframe on the one hand, and additionally the displacement of the sliding frame.

The currently known buggies of the above-described type have in common that the significant parts of the sliding frame and of the underframe consist of a comparatively high number of component parts, which require a quite time-extensive assembly in response to the production. At least partially, these are metal parts, such as struts, wheel axles, parts of the frame and the like, for example. Common fastening elements, such as screws, rivets and the like are used for connecting the individual components.

A buggy (English term "stroller") comprising the features of the above-mentioned species is described in US 2010/0109293 A1. The procedure in response to collapsing this buggy from the ready use position into the compact transport position is as follows. The connection in the joint region between the upper portion of the sliding frame and the lower portion of the sliding frame is released and the upper portion of the sliding frame is then pivoted backwards towards the lower portion by almost 180°. The front wheels, which are located on transverse connection of the lower portion of the sliding frame, stand comparatively narrowly and the rear wheels, which are located on a rear frame of the underframe, stand further spaced apart than the front wheels, so that, in the collapsed state, the two front wheels are located between the rear wheels. In the case of this buggy, the rear frame also encompasses a transverse strut, which, by comparison, however, is arranged on the bottom, wherein the struts starting at the rear wheels, continue upwards beyond this transverse strut up to a joint, on which these struts are connected to the lower portion of the sliding frame in an articulated manner. A transverse connection does not exist in the region of these joints. This known buggy is mainly embodied to accommodate a further seat frame, which is adjustable, in the sliding frame, so that it is possible to hold a child in a sitting or also in an upright position. For this reason, the entire frame design is very complex and comprises a plurality of components.

A further buggy is known from DE 20 2005 013 397 U1, which, in response to being collapsed into the compact transport position, shows a similar cinematic as the above-mentioned buggy. However, only a single front wheel is present in the case of this buggy. At the location, where the rear frame is connected to the lower portion of the sliding frame in an articulated manner, a transverse strut is present. Said transverse strut, however, is flat, serves to reinforce the lower portion of the sliding frame and does not have any function for the joint. A further transverse strut, which connects the two struts, which run at an incline to the rear wheels, to each other, is present on the rear frame comprising the rear wheels. This transverse strut, however, runs at a distance underneath the above-mentioned strut of the sliding frame and also does not have any function for the joint. This document relates to a mechanism for unlocking a lock for the purpose of releasing the joints, which then make it possible to collapse the buggy into the transport position. This mechanism is designed so as to be comparatively complex and is thus prone to malfunctions. Due to the mechanism, the region around the joints in the case of this buggy additionally consists of many, partially smaller component parts, which do not allow for a rational production. Provision is furthermore also made for using many metallic components in response to the production of this buggy.

Based on the above-mentioned problematic, the task of the instant invention is to improve the design of a buggy of the above-mentioned species in view of a more cost-efficient production and shortening of the assembly time, while maintaining the functionality.

A buggy of the above-mentioned species comprising the characterizing features of the main claim provides the solution of this task. Provision is made according to the invention for an articulated sleeve, which runs in transverse direction, to be located on the lower portion of the sliding frame, and for an upper horizontal transverse strut of the rear frame to be accommodated in this articulated sleeve so as to be pivotable about a horizontal axis.

DETAILED DESCRIPTION

Preferably, the supporting parts of the buggy according to the invention are constructed mainly from only three components. The first component forms the upper portion of the sliding frame, the second component forms the lower portion of the sliding frame and is connected to the first component via joints, so that the upper portion of the sliding frame can be pivoted in relation to the lower portion of the sliding frame. The front wheels can be located on this lower portion of the sliding frame. The third component is the so-called rear frame, on which the rear wheels can be located, wherein this rear frame, in turn, pivots about a horizontal axis in relation to the lower portion of the sliding frame, when the buggy is collapsed. In contrast to the state of the art according to DE 20 1008 017 305 U1, the upper portion of the sliding frame is preferably not folded onto the lower portion according to the invention, but is pivoted away from it in reverse direction of rotation towards the back. In addition, a flat basic horizontal structure, which extends from the rear wheels to the front wheels, is no longer present in the case of the solution according to the invention, but the front wheels and rear wheels move towards each other in response to the collapsing. On the contrary, a horizontal connection between front wheels and rear wheels does not exist anymore. The buggy according to the invention can thus be folded sp as to be quite flat.

In contrast to the solution, which is known from the state of the art according to DE 10 2007 047 702 A1, the solution according to the invention differs in that the upper portion of the sliding frame is not displaced inwardly in response to being collapsed, but is pivoted about a common axis of articulation in relation to the lower portion of the sliding frame. The pivoting of the rear frame, which according to the invention supports the rear wheels, is also different than in the case of the state of the art, where the struts, on which the rear wheels are located, in each case pivot individually about inclined axes. In contrast, only one horizontal axis is present according to the invention and, in response to being collapsed, the rear frame pivots in one piece about this axis in relation to the lower portion of the sliding frame, namely simultaneously and preferably also in the same direction as the direction of rotation with the pivoting of the upper portion of the sliding frame.

This has the considerable advantage that the buggy can be collapsed into the compact state by means of only one movement, wherein the upper portion of the sliding frame and the rear frame move towards the lower portion of the sliding frame (on which the front wheels are located as a rule) and these three main parts of the frame of the buggy can be placed down to be flat into an approximately parallel position of these frame parts. In addition, a number of components are no longer necessary in the case of the solution according to the invention as compared to the mentioned state of the art, because the arrangement of rods, on which the rear wheels are located and the arrangement of rods, on which the front wheels are located, are connected to each other via an arrangement comprising only five struts.

A particularly preferred further development of the invention provides for support struts, the lower end of which is in each case attached to the rear frame of the underframe in an articulated manner and the upper end of which is in each case attached to the upper portion of the sliding frame in an articulated manner, to be provided on both sides of the underframe. In the unfolded state of the buggy, in the case of locked joints (for example by locking in place), these support struts support the upper portion of the sliding frame on both sides, in each case in relation to the rear frame, and can assume an approximately vertical position in the unfolded state, for example. To reduce the number of components and to stay with the concept of a production of the buggy exclusively from injection molded components made of plastic, if possible, the articulated lugs for the articulated attachment of the support struts on the upper portion of the sliding frame on the one hand and/or on the rear frame on the other hand, can in each case be injection molded, so that only two further components are required with the support struts, but no further fastening elements become necessary for the joints.

According to a preferred further development of the instant invention, the rear frame of the underframe encompasses a support leg on each side, to which an axle for a rear wheel is in each case integrally molded in each case in the lower end region.

In a further preferred manner, the rear frame of the underframe is thereby a component, which is injection molded of plastic in one piece, comprising two support legs, the horizontal transverse strut, which connects the two support legs to each other on the top, in each case one axle for a rear wheel, integrally molded to each support leg in each case in the lower end region, as well as, if necessary, a further lower transverse strut, which connects the two support legs. By integrally molding the two axles for the rear wheels to the rear frame, the above-mentioned concept of reducing the necessary components and the complete production of injection molded components made of plastic, if possible, is continued consequently. Contrary to the buggies, which are known from the state of the art, neither separate components, nor metallic components are required for the axles for the rear wheels. Instead, the axles can be integrally molded at the same time in response to the injection molding of the rear frame. This later provides for a complete recycling of the buggy without material separation. The buggy is virtually completely material-homogenous. However, the assembly of the buggy in response to the production is furthermore also simplified considerably, because the rear wheels can be attached very quickly to the injection molded axles.

A particularly advantageous brake for a buggy, in particular a buggy comprising the features of the above-mentioned type, which is the subject matter of claim 5, is furthermore the subject matter of the instant invention. Provision is made according to this for the brake for the rear wheels to comprise a slider, which can be moved along a lower transverse strut of the rear frame in a guide and which is provided with brake elements on the end side, wherein the brake elements simultaneously engage on both rear wheels with corresponding engagement elements in response to the displacement of the slider in its guide in one direction. It is advantageous here that a brake mechanism, which is designed in a simple manner and which, if necessary, can even be made from only one component, which can also be made of plastic by means of injection molding, exists for the rear wheels, because the brake elements for both rear wheels can be located on the slider. The guide for this slider is located on the rear frame, for example on said transverse strut, which can be embodied so as to be curved, for example. Further components for the brake mechanism are thus also not required on the rear frame. In turn, the assembly is again simplified considerably, because only one component must be assembled for the brake mechanism.

For example, said slider for the brake mechanism can encompass tooth clamps as brake elements, which engage with corresponding sprockets on the rear wheels, wherein the engagement is made with an inner sprocket in the case of a rear wheel and the engagement is made with an outer sprocket in the case of the other rear wheel. This preferred design makes it possible to brake both rear wheels simultaneously by moving the slider in one direction. The slider comprising the brake elements can be a curved component, which is injection molded of plastic in one piece, for example, for which a curve slot in the transverse strut of the rear frame serves as guide. By sliding back and forth, the slider then in each case reaches from the brake position into the released position, for example.

To consequently follow the above-mentioned concept of reducing the necessary components and the complete production from injection molded components made of plastic, if possible, provision is preferably furthermore made for the elements, which are necessary for the joints for connecting the upper portion to the lower portion of the sliding frame in an articulated manner, in each case to be injection molded on the two said portions, so that separate joint components are not required. For example, the lower portion of the sliding frame can be a component, which is injection molded of plastic in one piece, in the form of a U strut, which is open towards the top, in each case comprising corresponding joint halves of the joints for the articulated connection to the upper portion of the sliding frame, in each case in the upper end region of the two journals of the U strut. The upper portion of the sliding frame can also be a component, which is injection molded of plastic in one piece, for example, in the form of a U strut, which is open towards the bottom, in each case comprising corresponding joint halves of the joints for the articulated connection to the lower portion of the sliding frame. All of the joint elements, which are necessary for the articulated connection between upper and lower portion of the sliding frame, thus consist of plastic and are located on these two portions of the sliding frame in one piece and so as to be injection molded.

In the case of common buggies, it is typically the case that separate fastening elements, such as snap fasteners or the like, which consist of metal for the most part and which must be attached by the manufacturer in response to the first assembly of the buggy, are used for attaching a textile seat to the frame of the buggy. In contrast, in the case of the solution according to the invention, elements for a fastening of a textile seat are preferably injection molded to journals of the U strut of the upper portion of the sliding frame, in each case on the inner side, so that a simpler recycling of the entire buggy also becomes possible by means of this measure and the assembly time is further shortened.

A particularly advantageous alternative design embodiment of a buggy, in particular of a buggy comprising the features of the above-mentioned type, which is the subject matter of claims 12 and 13, is furthermore the subject matter of the instant invention. Provision is made according to this for all of the supporting components of the sliding frame and of the underframe as well as all of the significant functional components of the buggy to consist exclusively of material-homogenous plastics. This alternative embodiment has the particular advantage that such a buggy can be recycled without any problems. A separation according to components having different materials is not necessary and, if applicable, not even a disassembly, because the buggy as a whole can then simply be broken up and melted down.

Preferably, sliding frame and underframe comprising all of the significant functional components furthermore consist of a total of only five injection molded components made of plastic, which can be connected to each other,
namely a component, which comprises the upper portion of the sliding frame,
a component, which comprises the lower portion of the sliding frame,
a component, which comprises the rear frame,
as well as two support struts, the lower end of which is in each case attached to the rear frame of the underframe in an articulated manner and the upper end of which is in each case attached to the upper portion of the sliding frame in an articulated manner. This provides for a very cost-efficient production of the buggy by injection molding only a few components made of plastic, which can subsequently be assembled in only a few process steps within only a very short period of time. While an assembly time by hand of one hour or more is required for the assembly of a common buggy, due to the plurality of component parts, of which it consists and which need to be connected to each other, for the most part via screw and rivet connections, a buggy according to the invention can be assembled within only a few minutes. It is obvious that this leads to a quite considerable decrease of labor expenses in response to the assembly and thus to a considerable decrease of the production costs.

A further advantageous preferred alternative embodiment of a buggy according to the invention provides for the upper horizontal transverse strut of the rear frame to encompass spanner flats, to which correspondingly dimensioned assembly accommodations are assigned in the articulated sleeve on the lower portion of the sliding frame, so that, after the assembly of the buggy, the transverse strut can no longer be removed from the articulated sleeve, which accommodates this transverse strut so as to be pivotable about a horizontal axis. The connection between the rear frame and the lower portion of the sliding frame is thus embodied such that it can only be established in response to the first assembly by the manufacturer, but cannot be released again by the user later on. The connection of these supporting components of the frame is thus permanently stable and an unintentional release is avoided.

The features, which are described in the subclaims, relate to preferred further developments of the task solution according to the invention. Further advantages of the instant invention follow from the detail description below.

BRIEF DESCRIPTION OF THE DRAWINGS

The instant invention will be defined in more detail below by means of exemplary embodiments with reference to the enclosed drawings.

FIG. 6 shows a view of the rear frame of the buggy, viewed from the rear side;

FIG. 7 shows an enlarged detail view in the region of the articulated sleeve of the lower portion of the sliding frame, which accommodates the upper transverse strut of the rear frame, viewed in a slightly different angle (from the underside) than in FIG. 6;

FIG. 7 a shows an enlarged detail view of the lower portion of the sliding frame, viewed from the front side;

FIG. 8 shows a component part view of the slider for the brake mechanism;

FIG. 9 shows a detail view, which shows, how the brake elements of the slider engage with the sprocket of a rear wheel;

FIG. 11 b shows a further detail view of the joint, viewed in a different angle than in FIG. 11 a;

FIG. 12 shows a detail view in the region of the suspension of one of the front wheels.

DETAILED DESCRIPTION OF THE PREFERRED EMBODIMENT

Figure 1:
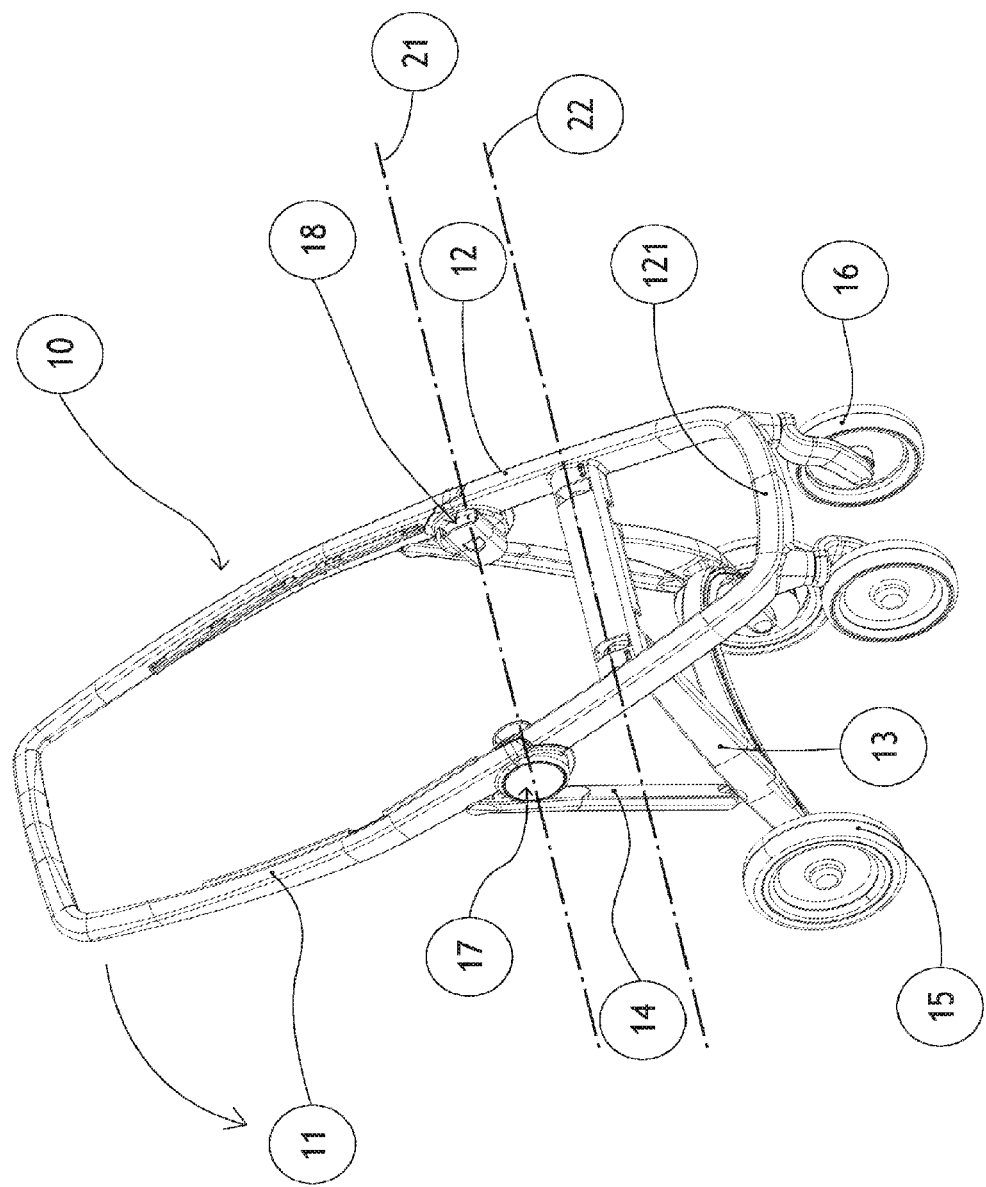
FIG. 1 shows a perspective overall view of a buggy according to the invention according to an exemplary alternative embodiment.

Reference is initially made to FIG. 1, which shows a perspective overall view of a buggy 10 according to the invention in the unfolded use state, wherein only the frame, however, is illustrated, and not the textile lining, which forms the seat of the buggy and which is fastened to parts of the frame, as will be explained later in more detail. The entire frame construction substantially consists of only three main components, namely the upper portion 11 of the sliding frame, the lower portion 12 of the sliding frame, and the rear frame 13. There are also two parallel support struts 14, which run approximately vertically in the illustrated unfolded state according to FIG. 1.

The outline of the upper portion 11 of the sliding frame is substantially U-shaped, wherein the U shape is open towards the bottom. The outline of the lower portion 12 of the sliding frame is also substantially U-shaped, wherein, the U shape, however, is open towards the top here, that is, it is open towards the upper portion 11 of the sliding frame. The two front wheels 16 of the buggy 10 are attached to the lower U bar 121 of the lower portion 12 of the sliding frame, which runs transversely. The two rear wheels 15 of the buggy 10 are located on the rear frame 13. The lower portion of the rear frame 13 comprising the rear wheels 15, together with the lower region of the lower portion 12 of the sliding frame, quasi forms the underframe of the buggy, that is, a separate component is no longer necessary for the underframe, but the entire supporting design comprising the sliding frame and the underframe follows from the three mentioned main components, namely upper portion 11 of the sliding frame, lower portion 12 of the sliding frame and rear frame 13. These three main components are preferably in each case made of plastic in one piece, in particular in the injection molding process, whereby virtually all of the further applications and functional components are located on the three main components, already after the production, that is, they are also injection molded, so that many subsequent assembly processes can be simplified or are no longer necessary.

Figure 3:
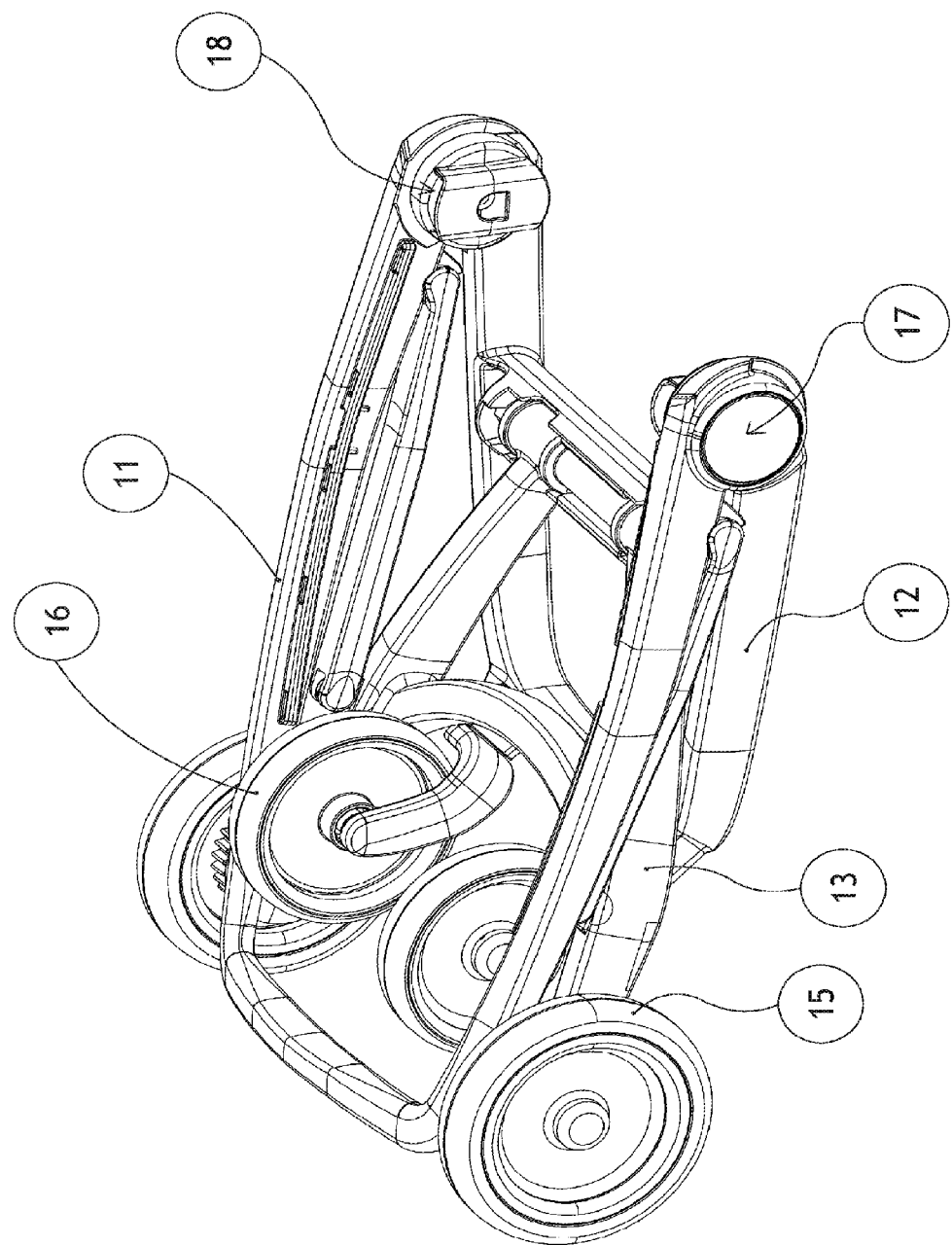
FIG. 3 shows a further perspective view of the buggy in the completely collapsed state.

The approximately U-shaped upper portion 11 of the sliding frame and the approximately U-shaped lower portion 12 of the sliding frame are connected to each other in an articulated manner in the end regions of their two U journals 111, 112 or 122, 123, respectively, which face each other, in each case via joints 17, 18, namely such that the upper portion 11 can be tilted backwards and can be pivoted or folded by almost 180° after unlocking the joints 17, 18, until the buggy assumes a flat, collapsed transport state, which is illustrated in FIG. 3. Outer joint halves 171, 181, which are preferably also injection molded in response to the production, are thereby in each case located on the upper portion 11 of the sliding frame on both sides, while inner joint halves 172, 182, which can also be injection molded, are in each case located on the lower portion 12 of the sliding frame, wherein the respective joint halves interact and partially engage with each other, so that the upper portion 11 and the lower portion 12 can pivot in relation to each other when the joints are released. As can be seen, the two support struts 14 are in each case connected on their respective upper end in an articulated manner to one journal of the upper portion 11 of the sliding frame, on the one hand in the vicinity slightly above the joint 17, 18, while on their lower end, the two support struts 14 are in each case connected to the rear frame 13 in an articulated manner, namely in each case to a portion of the rear frame 13, which in each case forms a support leg 132, 133. The support struts 14 are to some extent attached to the rear frame 13 above the axle 134 of the rear wheels 15 in an articulated manner.

Figure 2:
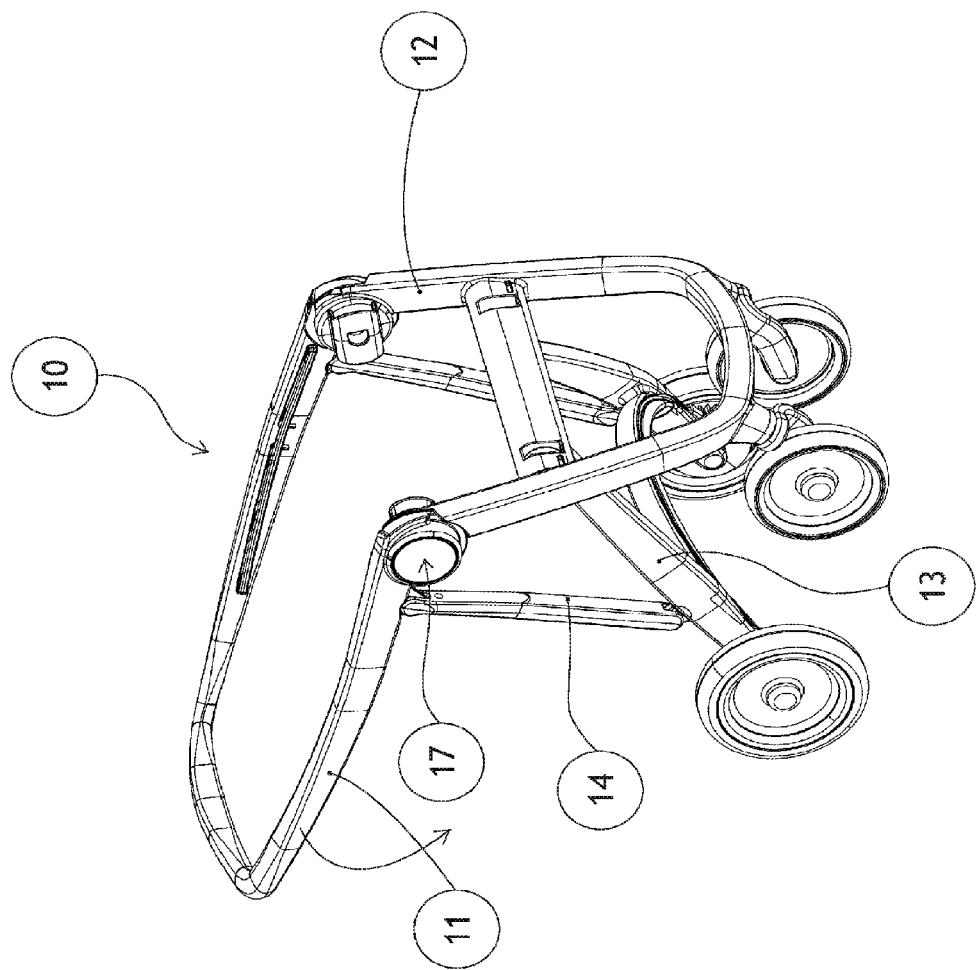
FIG. 2 shows a further perspective view of the buggy in the partially collapsed state.

FIGS. 2 and 3 show the buggy 10 in response to being collapsed into the flat transport position in different stages. Based on the unfolded use position according to FIG. 1, the buggy 10 is collapsed after the two joints 17, 18 are released, in that the upper portion 11 of the sliding frame is pivoted backwards and downwards about the axis 21, which runs in transverse direction through the joints 17, 18. In response to this collapsing, the lower portion 12 of the sliding frame moves towards the rear frame 13 at the same time, wherein the front wheels 16 move towards the rear wheels 15, because the lower portion 12 pivots about the axis 22, which runs in transverse direction. An articulated sleeve 124, through which this joint axis 22 extends and which runs in transverse direction, is thereby located on the lower portion 12 of the sliding frame, wherein this articulated sleeve 124 accommodates an upper horizontal transverse strut 131 of the rear frame 13 in a pivotable manner. In the completely collapsed position according to FIG. 3, the buggy is then completely flat, the upper portion 11 of the sliding frame is located on the rear frame 13 comprising the rear wheels 15 and the rear frame, in turn, is located on the lower portion 12 of the sliding frame comprising the front wheels 16. The upper portion 11 of the sliding frame thus pivots from the unfolded position according to FIG. 1 by approximately 180° into the completely collapsed position according to FIG. 3.

Figure 4:
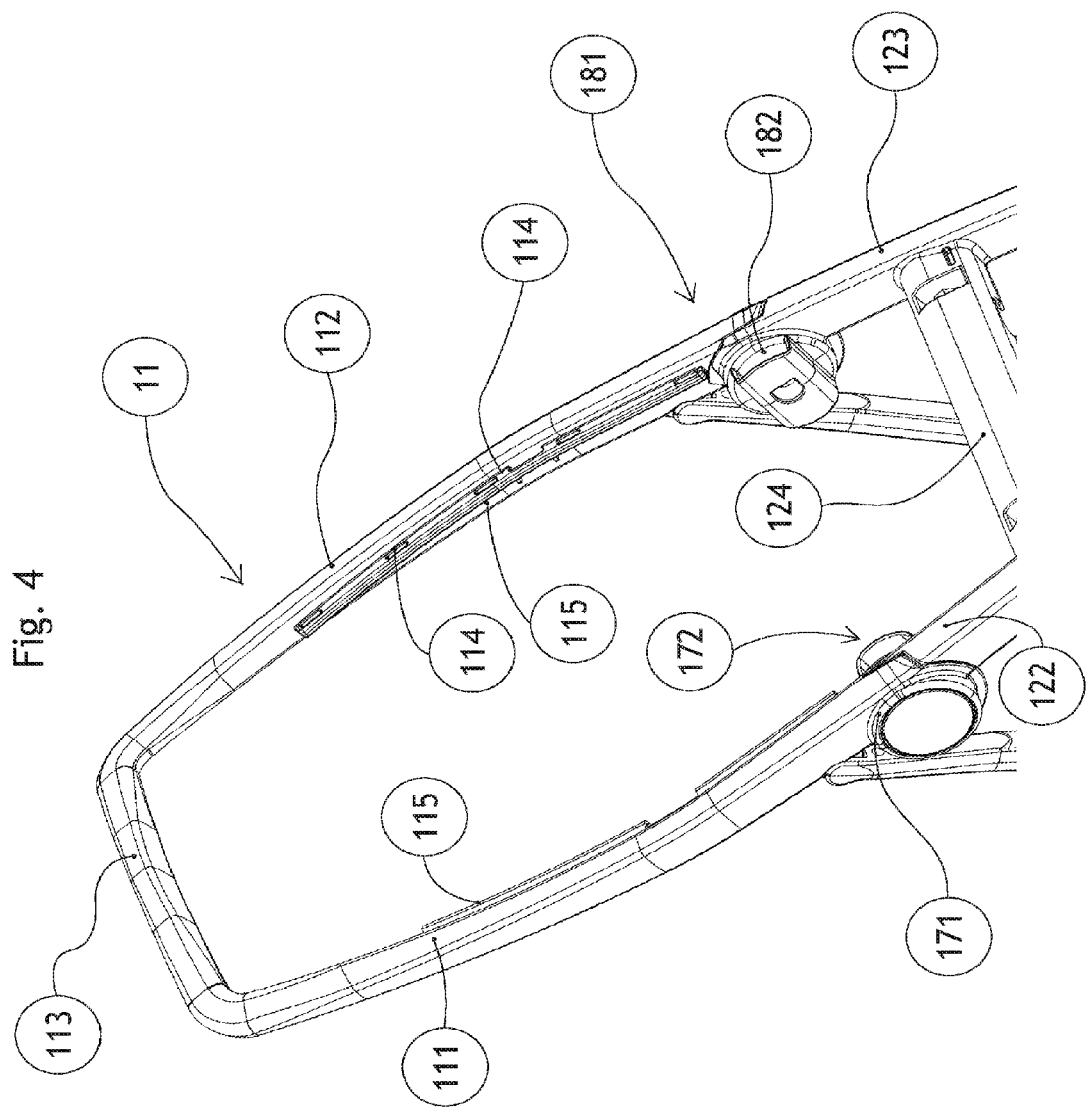
FIG. 4 shows an enlarged detail view of the upper portion of the sliding frame of the buggy.
Figure 5:
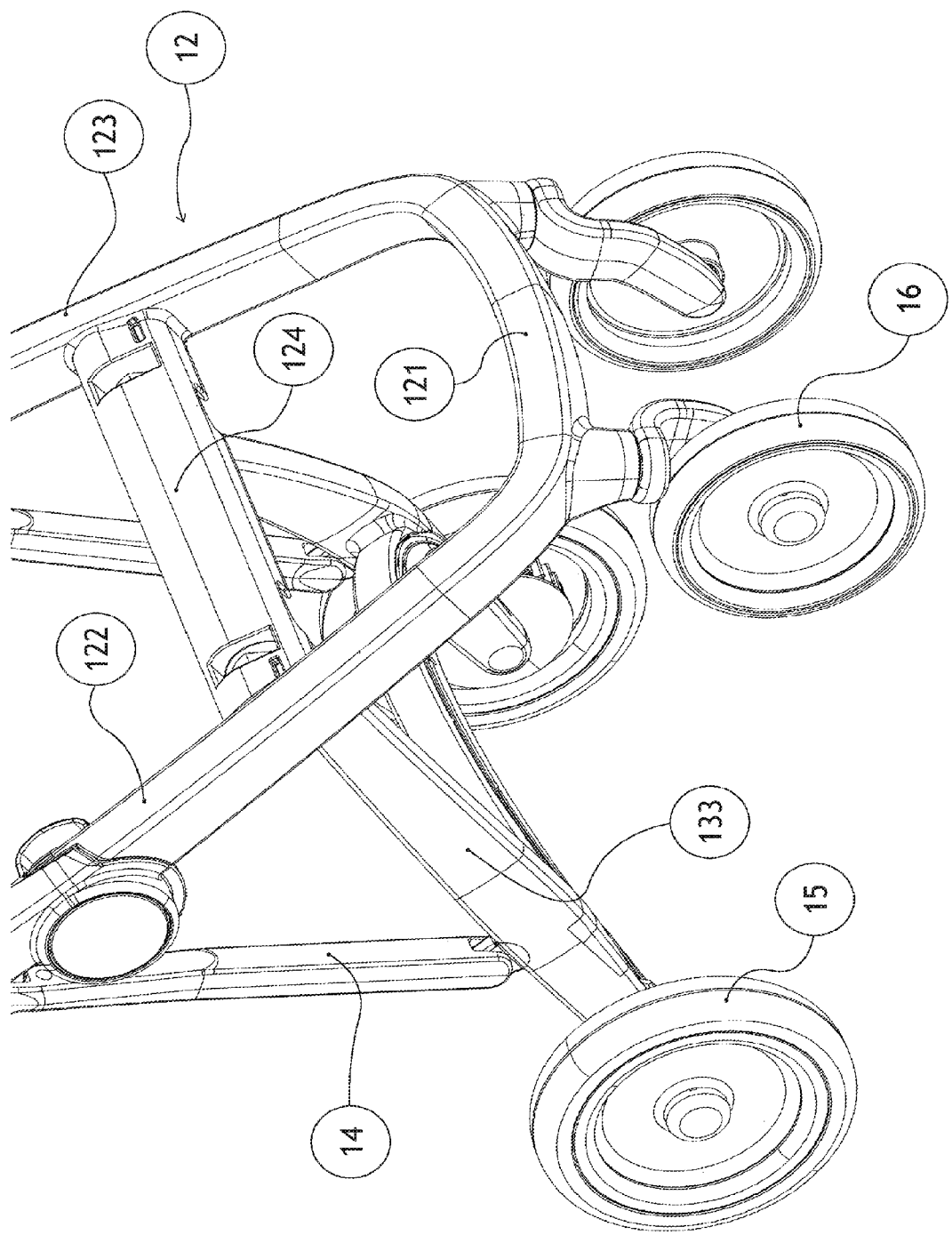
FIG. 5 shows an enlarged detail view of the lower portion of the sliding frame of the buggy.

FIG. 4, to which reference will be made below, shows an enlarged view of the upper portion 11 of the sliding frame. The upper portion 11 of the sliding frame has a substantially U-shaped outline, wherein the U shape is open towards the bottom. The two U journals 111, 112 are thus connected to each other on the upper side by means of the U bar 113, which runs in transverse direction. In each case injection molded on the outside, the two outer joint halves 171, 181 are located on the respective lower ends of the two U journals 111, 112, which face the lower portion 12 of the sliding frame, because the upper portion 11 of the sliding frame is connected in an articulated manner to the lower portion 12 of the sliding frame via the two joints 17, 18 at that location, wherein the joint axis 21 runs in transverse direction through these joints. With the respective outer joint half 171, 181, a significant element, in this case a ring-shaped guide element, is thus located directly on the journals of the U-shaped upper portion 11 of the sliding frame. In contrast, a joint element, which interacts therewith in each case, namely the respective inner joint half 172, 182, is in each case located on the upper end of the two U journals 122, 123 of the lower portion 12 of the sliding frame, which is also U-shaped and which is illustrated in FIG. 5. The significant parts of the two joints 17, 18 are thus injection molded to the two U-shaped portions 11 and 12 of the sliding frame. If applicable, only inner joint parts, which can also be made of plastic, are required for the joint function. The total number of the components, which is required for the joints 17, 18, is thus greatly reduced as compared to common joints of this type, whereby the production as well as the assembly costs are lowered.

As can furthermore be seen from FIG. 4, elongate fillets 115, in which a plural of recesses 114 are located in each case, to which the seat of the buggy, which is not illustrated here, can be fastened, are in each case integrally molded on the inner sides of two U journals 111, 112 of the upper portion 11 of the sliding frame. For example, corresponding fastening elements, which are located on the seat, which on principle consists of textile, can be engaged here or the like. Additional metallic fastening elements are thus no longer necessary. The fillets 115 comprising the recesses are also injection molded in an advantageous manner in response to the injection molding of the upper portion 11.

The lower portion 12 of the sliding frame, which is illustrated in FIG. 5, forms the second, substantially supporting frame component of the buggy 10. In addition to the U shape, which is open towards the top, comprising the two U journals 122, 123 and the U bar 121, which connects them on the bottom, said lower portion 12 comprises an articulated sleeve 124, which runs parallel at a distance further above the U bar 121 in transverse direction and which connects the two U journals 122, 123 to each other and which is embodied so as to be partially open towards the underside. The rear side and partially the underside of this articulated sleeve 124 can also be seen in FIG. 6. This articulated sleeve, in turn, is preferably injection molded on the lower portion 12 of the sliding frame and is thus a rigid component. It is hollow and rotatably accommodates an upper horizontal transverse strut 131 of the rear frame 13, so that a second joint follows here and rear frame 13 and lower portion 12 of the sliding frame are connected to each other in an articulated manner at that location about an axis 22, which runs in transverse direction. FIG. 7 shows that the transverse strut 131, on its respective ends, encompasses flat portions, which result in spanner flats 131 a. Recesses 124 a, which are dimensioned accordingly in the two outer end regions, are in each case formed on the articulated sleeve 124, so that the flat portions 131 a of the transverse strut 131 can be inserted into the articulated sleeve 124 only in a certain rotary position in response to the first assembly by the manufacturer. As soon as the buggy has been assembled completely, this rotary position, which would be required for a further release, can no longer be reached. It is prevented through this that the articulated connection between the articulated sleeve 124 and the transverse strut 131 and thus between the lower portion 12 of the sliding frame and the rear wheel 13 can be released unintentionally after the assembly of the buggy.

The setup of the rear frame 13, which forms the third larger supporting component of the frame of the buggy 10, becomes clear from FIG. 6. The outline of this rear frame 13 has a shape, which is derived from a U, wherein the U journals are formed by the two support legs 132, 133, on the lower ends of which the rear wheels 15 are attached in each case. The two support legs 132, 133 run slightly towards each other in a slight curve towards the top and are connected to each other on their respective upper ends in transverse direction via the horizontal transverse strut 131, which is accommodated in the articulated sleeve 124 of the lower portion 12 of the sliding frame. At a distance below the upper transverse strut 131, which quasi forms the U bar of the U shape, an additional, slightly curved, lower transverse strut 135 is present, which connects the two support legs 132, 133 to each other in transverse direction and which additionally stabilizes the rear frame 13. This curved transverse strut 135 runs slightly above the rear wheels 15. A support strut 14, which establishes the articulated connection between the rear frame 13 and the upper portion 11 of the sliding frame, is in each case attached in an articulated manner to each support leg 132, 133, approximately at the height of this curved transverse strut 135, wherein these two support struts 14 run approximately in vertical direction, viewed in the side view, when the buggy 10 is unfolded, and are at an acute angle to the support legs 132, 133 as well as to the U journals 111, 112. The entire frame design of the buggy, including a number of elements, which fulfill further functions, is already comprised with the upper portion 11 of the sliding frame, the lower portion 12 of the sliding frame, the rear frame 13 and the two support struts 14, that is, with a total of only five components.

Figure 10:
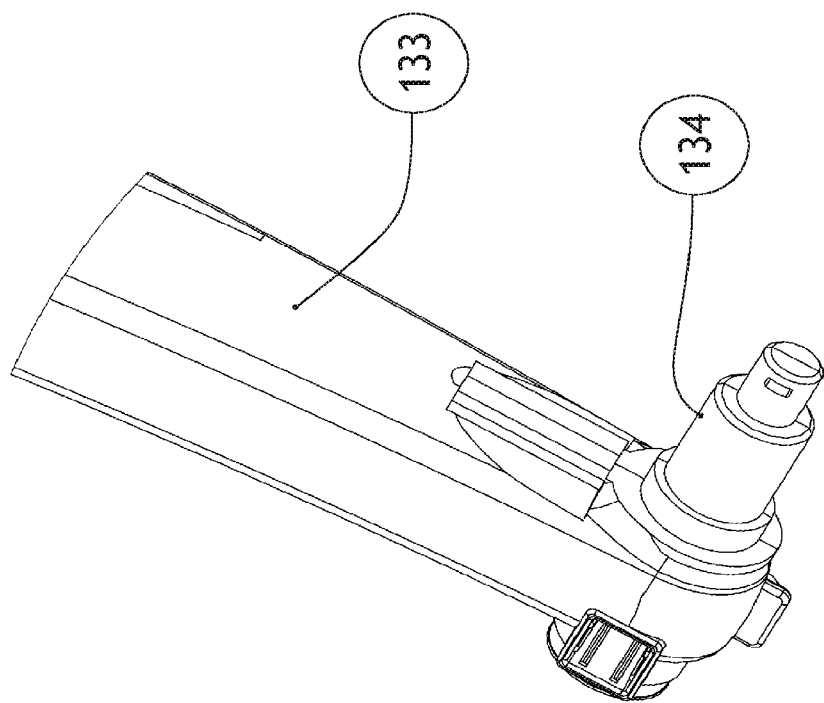
FIG. 10 shows a detail view of the axle, which is injection molded to the rear frame, for a rear wheel.

The axle 134 for the one rear wheel 15, which has been removed in this view and which can be seen in the detail view according to FIG. 10, is such an element. It can be seen that this axle 134 is injection molded on the lower end of the support leg 133 and in the view from the rear onto the rear frame 13, extends at right angles to the outside from the support leg 133. The rear wheel 15 assembled on the support leg 133 of the rear frame 13 can be seen well in FIG. 5. The axle 134 of one of the rear wheels is illustrated in FIG. 10 in an enlarge scale. The fact that, after the injection molding of the support leg 133, the axle 134 is already located thereon, leads to a considerable time savings in response to the assembly of the rear wheel 15, which must then only be attached and fixed. In response to the subsequent disposal of the buggy, this simplifies the recycling, because a disassembly and separate disposal is no longer necessary after removing the rear wheel, as is the case with the metallic axles, which are currently used.

The rear side of the curved lower transverse strut 135, which is shown in FIG. 6, encompasses a guide grove 136, which is suggested in FIG. 7 a and which is provided for accommodating a slider 19, which can be displaced along this guide groove 136 and which is a part of the brake mechanism for the rear wheels. This slider 19 is illustrated separately in FIG. 8. The slider 19 is preferably also a component made of plastic, which is made in an injection molding process. Due to the fact that the slider 19 is a comparatively flat plastic part, it is sufficiently flexible and can be inserted into the curved guide groove 136 and can be displaced along it. On its two ends, the slider 19 in each case encompasses braking elements 191 in the form of tooth clamps. However, the slider is thereby embodied so as to be asymmetrical in relation to the ends, because the tooth clamp 191 is directed downwards on the one end and the tooth clamp is oriented upwards on the other end of the slider. A double sprocket, which is arranged concentrically to the wheel tread, comprising an inner sprocket 151 and an outer sprocket 152, is located on the rear wheels 15 (see FIG. 9) on the inner side, which faces the respective support leg 132, 133, wherein the outer sprocket 152 can be seen in FIG. 9. When the slider 19 is now displaced in its groove to a certain extent by means of a mechanism, which is not explained herein in detail, in response to the actuation of the brake, the tooth clamp 191, which is oriented downwards, engages with the outer sprocket 152 due to the asymmetrical embodiment of the ends on the one rear wheel 15, because the slider is pressed downwards on this end. On the other end of the slider, which is pulled upwards in response to the displacement, the tooth clamp 191, which is oriented upwards, simultaneously engages with the inner sprocket 151 of the other rear wheel 15, so that both rear wheels are braked simultaneously. The slider 19 comprising the tooth clamps is preferably also an injection molded component made of plastic, as are the sprockets on the rear wheels 15, so that a simple recycling is also possible here later on. The entire rear wheel comprising the tread can also consists completely of plastic, if applicable.

Figure 11B:
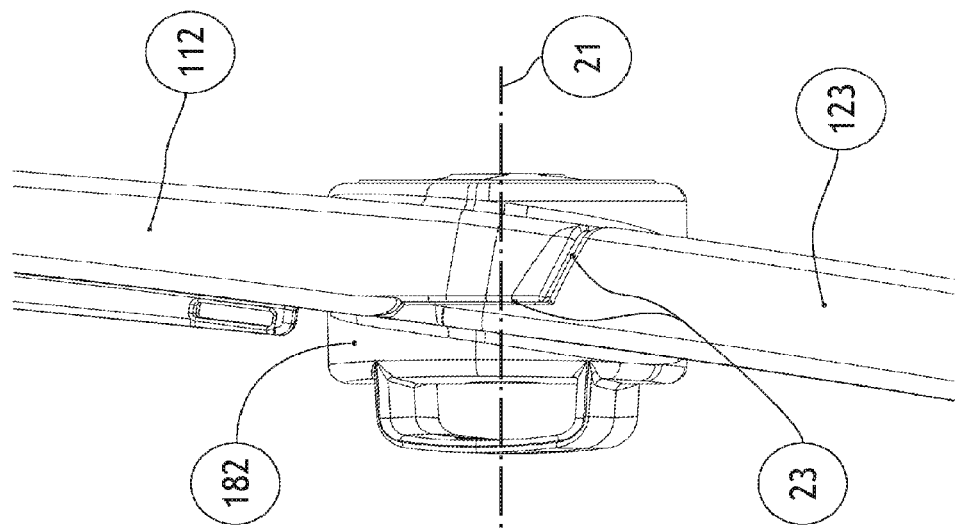
FIG. 11 a shows a detail view of a joint in the connecting region between the upper portion and the lower portion of the sliding frame.
Figure 11A:
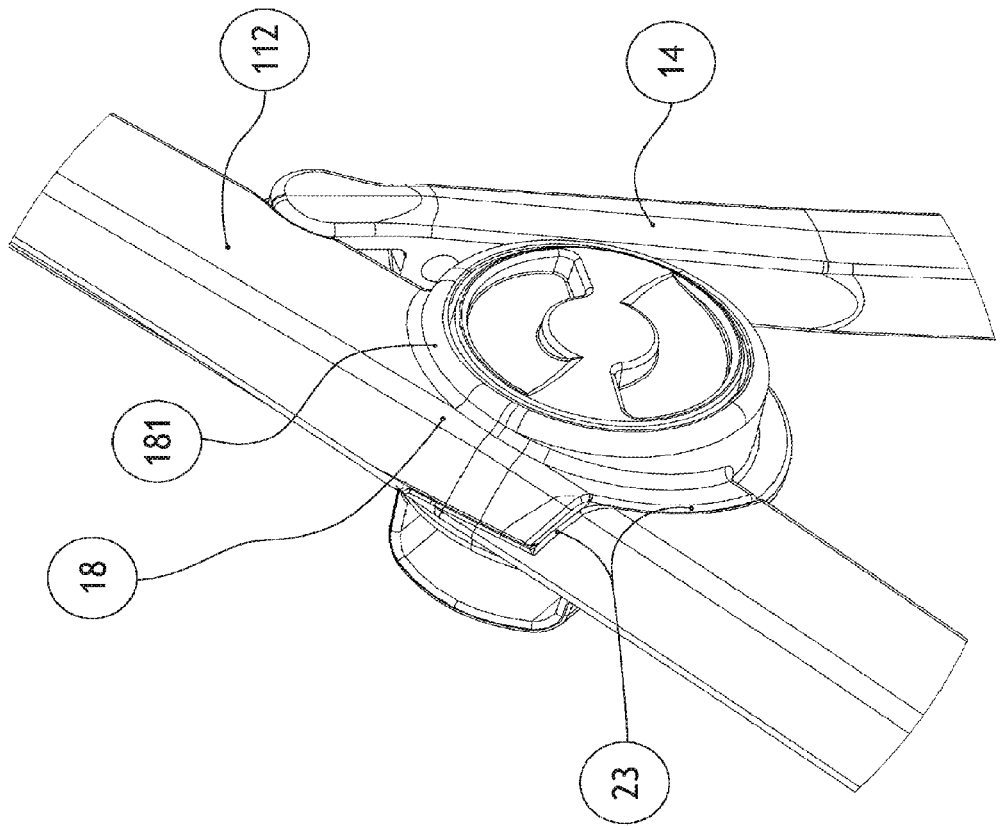

FIGS. 11 *a* and 11 *b* once again illustrate one of the joints 18, which connect the upper portion 11 to the lower portion 12 of the sliding frame in an articulated manner, in two different views. In FIG. 11 *a*, the joint 18 can be seen transversely from the outside, in FIG. 11 *b*, the joint can be seen approximately vertically to the joint axis 21. It can be seen better in these illustrations that the outer joint half 181 is integrally molded on the U strut 112 of the upper portion 11, while the inner joint half 182 is integrally molded on the U strut 123 of the lower portion 12 of the sliding frame. In the unfolded use state, a parting line 23, which encompasses an offset, which is illustrated in FIG. 11 *a* as well as in FIG. 11 *b*, runs between the two U struts 112, 123, which are aligned to each other.

The suspension of one of the steerable front wheels 16 is once again illustrated in detail in FIG. 12. For this purpose, a sleeve 125, which accommodates the upper, shorter journal 201 of a suspension 20 for the front wheel so as to be rotatable about an approximately vertical axis and which in each case extends downwards when the buggy 10 is erect, is injection molded on the lower portion 12 of the sliding frame in the outer region of the U bar 121. This suspension 20 is an approximately reverse L-shaped component, the longer journal 202 of which, which is oriented downwards, encompasses the wheel axle 203 for the front wheel 16, which extends horizontally outwards at a right angle. This suspension can also be a component, which is made from plastic in an injection molding process. In view of this suspension 20, the concept according to the invention of a simple recycling and of a quick assembly is thus also maintained due to the considerably reduced total number of used components. Only the slider 19 for the brake mechanism and the two suspensions 20 for the front wheels need to be added to the above-mentioned five significant supporting components, so that, without the four wheels, only a total of eight components made of plastic are present, each of which can be made by means of injection molding. To obtain a weight reduction with simultaneously stable and mechanically resilient frame components, the frame components, such as the upper portion 11 of the sliding frame, the lower portion 12 of the sliding frame, and the rear frame 13 can be made as struts, which are hollow on the inside, for example, comprising a sufficient wall thickness. The internal gas pressure injection molding can thereby be used in particular to produce these components, whereby components, which are hollow on the inside and which comprise complex molded recesses, can also be produced.

LIST OF REFERENCE NUMERALS 10 buggy
11 upper portion of the sliding frame
111 U journal
112 U journal
113 U bar
114 recesses for seat attachment
115 fillets
12 lower portion of the sliding frame
121 U bar
122 U journal
123 U journal
124 articulated sleeve
124 *a* recesses
125 sleeves
13 rear frame
131 horizontal transverse strut
131 *a* spanner flats, flat portions
132 support leg
133 support leg
134 axle for rear wheel
135 curved transverse strut
136 guide groove
14 support struts
15 rear wheels
151 inner sprocket
152 outer sprocket
16 front wheels
17 joint
171 outer joint half
172 inner joint half
18 joint
181 outer joint half
182 inner joint half
19 slider
191 brake elements on the slider
20 suspension for front wheel
201 shorter journal of the L
202 longer journal of the L
203 wheel axle of the front wheel
21 axis
22 axis
23 parting line

The invention claimed is:

1. A buggy or collapsible perambulator, comprising a sliding frame which, in the unfolded state, runs in an inclined plane and has a division, in the region of which joints are located, and therefore, upon collapsing, an upper portion of the sliding frame is pivotable in relation to a lower portion of the sliding frame about the approximately horizontal axis of said joints, and furthermore comprising an underframe with wheels, wherein, in the collapsed state, the lower portion and upper portion of the sliding frame and at least parts of the underframe are virtually parallel and the buggy assumes a flat, compact state, wherein the two portions of the sliding frame, which are pivotable in relation to each other, each have approximately the shape of a U bar, wherein suspensions of the front wheels are located on the lower portion of the sliding frame, and suspensions for rear wheels are located on a rear frame of the underframe, said rear frame having a horizontal first transverse strut, wherein an articulated sleeve, which runs in transverse direction, is located on the lower portion of the sliding frame, and said horizontal first transverse strut of the rear frame is accommodated in this articulated sleeve so as to be pivotable about a horizontal axis, and wherein support struts are provided on both sides of the underframe, the lower end of each support strut is attached to the rear frame of the underframe in an articulated manner and the upper end of each support strut is attached to the upper portion of the sliding frame in an articulated manner.

2. The buggy according to claim 1, wherein the rear frame of the underframe encompasses a support leg on each side, to which an axle for a rear wheel is in each case integrally molded in the lower end region.

3. The buggy according to claim 1, wherein the lower portion of the sliding frame is a component, which is injection molded of plastic in one piece, in the form of a U strut, which is open towards the top of the buggy, comprising joint halves of the joints for the articulated connection to the upper portion of the sliding frame, in each case in the upper end region of two journals of the U-strut.

4. The buggy according to claim 3, wherein sleeves, in which the suspensions of the front wheels are located so as to be rotatable about a vertical axis and thus so as to be steerable, are furthermore injection molded in the lower end region on the lower portion of the sliding frame.

5. The buggy according to claim 3, wherein the upper portion of the sliding frame is a component, which is injection molded of plastic in one piece, in the form of a U strut, which is open towards the bottom, in each case comprising corresponding joint halves of the joints for the articulated connection to the lower portion of the sliding frame.

6. The buggy according to claim 5, wherein elements for a fastening of a textile seat are furthermore injection molded to journals of the U strut of the upper portion of the sliding frame.

7. The buggy according to claim 1, wherein the horizontal first transverse strut of the rear frame encompasses spanner flats, to which correspondingly dimensioned assembly accommodations are assigned in the articulated sleeve on the lower portion of the sliding frame, so that, after the assembly of the buggy, the horizontal first transverse strut can no longer be removed from the articulated sleeve, which accommodates said horizontal first transverse strut so as to be pivotable about a horizontal axis.

8. A buggy or collapsible perambulator, comprising a sliding frame which, in the unfolded state, runs in an inclined plane and has a division, in the region of which joints are located, and therefore, upon collapsing, an upper portion of the sliding frame is pivotable in relation to a lower portion of the sliding frame about the approximately horizontal axis of said joints, and furthermore comprising an underframe with wheels, wherein, in the collapsed state, the lower portion and upper portion of the sliding frame and at least parts of the underframe are virtually parallel and the buggy assumes a flat, compact state, wherein the two portions of the sliding frame, which are pivotable in relation to each other, each have approximately the shape of a U bar, wherein suspensions of front wheels are located on the lower portion of the sliding frame, and suspensions for rear wheels are located on a rear frame of the underframe, said rear frame having a horizontal first transverse strut, wherein an articulated sleeve, which runs in transverse direction, is located on the lower portion of the sliding frame, and said horizontal first transverse strut of the rear frame is accommodated in this articulated sleeve so as to be pivotable about a horizontal axis, and wherein the rear frame of the underframe is a component, which is injection molded of plastic in one piece, comprising two support legs, the horizontal first transverse strut, which connects the two support legs to each other on the top, in each case an axle for a rear wheel, integrally molded to each support leg in each case in the lower end region, as well as, if necessary, a lower second transverse strut, which connects the two support legs.

9. A buggy or collapsible perambulator, comprising a sliding frame which, in the unfolded state, runs in an inclined plane and has a division, in the region of which joints are located, and therefore, upon collapsing, an upper portion of the sliding frame is pivotable in relation to a lower portion of the sliding frame about the approximately horizontal axis of said joints, and furthermore comprising an underframe with wheels, wherein, in the collapsed state, the lower portion and upper portion of the sliding frame and at least parts of the underframe are virtually parallel and the buggy assumes a flat, compact state, wherein the two portions of the sliding frame, which are pivotable in relation to each other, each have approximately the shape of a U bar, wherein suspensions of front wheels are located on the lower portion of the sliding frame, and suspensions for rear wheels are located on a rear frame of the underframe, said rear frame having a horizontal first transverse strut, wherein an articulated sleeve, which runs in transverse direction, is located on the lower portion of the sliding frame, and said horizontal first transverse strut of the rear frame is accommodated in this articulated sleeve so as to be pivotable about a horizontal axis, wherein sliding frame and underframe, comprising all of the significant functional components, consist of a total of only five injection molded components made of plastic, which can be connected to each other, namely a component, which comprises the upper portion of the sliding frame, a component, which comprises the lower portion of the sliding frame, a component, which comprises the rear frame, as well as two support struts, the lower end of which is in each case attached to the rear frame of the underframe in an articulated manner and the upper end of which is in each case attached to the upper portion of the sliding frame in an articulated manner.

\* \* \* \* \*